United States Patent
Wilke et al.

(10) Patent No.: US 7,122,289 B2
(45) Date of Patent: *Oct. 17, 2006

(54) MIXTURE WHICH CAN BE THERMALLY HARDENED AND HARDENED BY ACTINIC RADIATION AND USE THEREOF

(75) Inventors: Guido Wilke, Münster (DE); Ulrike Röckrath, Senden (DE); Karl-Heinz Joost, Drensteinfurt (DE); Egon Wegner, Veitshöchheim (DE); Hubert Baumgart, Münster (DE); Uwe Meisenburg, Duisburg (DE)

(73) Assignee: BASF Coatings AG, Munster (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/468,884

(22) PCT Filed: Mar. 14, 2002

(86) PCT No.: PCT/EP02/02838

§ 371 (c)(1),
(2), (4) Date: Aug. 21, 2003

(87) PCT Pub. No.: WO02/079333

PCT Pub. Date: Oct. 2, 2002

(65) Prior Publication Data

US 2004/0053159 A1     Mar. 18, 2004

(30) Foreign Application Priority Data

Mar. 29, 2001  (DE)  ................................ 101 15 604

(51) Int. Cl.
G03F 7/004  (2006.01)
(52) U.S. Cl. ................................ 430/270.1; 430/284.1; 430/286.1; 427/508; 522/92; 522/104; 522/135
(58) Field of Classification Search ............. 430/270.1, 430/284.1, 286.1; 427/508; 522/91, 92, 522/104, 135
See application file for complete search history.

(56) References Cited

U.S. PATENT DOCUMENTS

| | | | |
|---|---|---|---|
| 4,128,600 A | * | 12/1978 | Skinner et al. |
| 5,546,768 A | * | 8/1996 | Kuhrau et al. |
| 6,013,326 A | * | 1/2000 | Flosbach et al. |
| 6,296,903 B1 | * | 10/2001 | Sapper et al. |
| 6,332,291 B1 | * | 12/2001 | Flosbach et al. |
| 6,333,077 B1 | * | 12/2001 | Maag et al. |
| 6,555,597 B1 | * | 4/2003 | Weikard et al. |
| 6,624,238 B1 | * | 9/2003 | Ott et al. |
| 6,653,394 B1 | * | 11/2003 | Meisenburg et al. |
| 6,720,384 B1 | * | 4/2004 | Mayer et al. |
| 6,747,091 B1 | * | 6/2004 | Baumgart et al. |
| 2004/0048977 A1 | * | 3/2004 | Wilke et al. ............... 524/589 |
| 2004/0052966 A1 | * | 3/2004 | Wilke et al. ............... 427/508 |

FOREIGN PATENT DOCUMENTS

| | | | |
|---|---|---|---|
| CA | 2386222 | * | 9/2000 |
| DE | 19841842 | * | 3/2000 |
| DE | 19855146 | * | 5/2000 |
| DE | 19908018 | * | 8/2000 |
| DE | 19920799 | * | 11/2000 |
| DE | 19920801 | * | 11/2000 |
| DE | 199 04 317 | * | 8/2002 |
| DE | 199 08 013 | * | 8/2002 |
| DE | CA 2258813 | * | 1/2005 |
| WO | WO02/079290 | * | 10/2002 |
| WO | WO02/079334 | * | 10/2002 |

OTHER PUBLICATIONS

U.S. Appl. No. 09/786,956.*
U.S. Appl. No. 09/856,949.*
U.S. Appl. No. 09/889,647.*
U.S. Appl. No. 09/890,520.*
U.S. Appl. No. 09/889,918.*
U.S. Appl. No. 10/018,106.*
U.S. Appl. No. 10/009,394.*
English Language Translation of WO02/079290.*
English Language Translation of WO02/079334.*
English Language Abstract of JP04293915, Derwent Accession No. 1992-394602, Oct. 19, 1992.*

* cited by examiner

Primary Examiner—Barbara L. Gilliam

(57) ABSTRACT

A mixture and method for preparing a composition curable thermally and with actinic radiation comprising a binder free from carbon-carbon double bonds activatable with actinic radiation, at least one blocked or unblocked polyisocyanate having at least one soft, flexibilizing segment, and at least one unsaturated polyfunctional urethane that is free from isocyanate-reactive functional groups and contains on average per molecule more than four carbon-carbon double bonds activatable with actinic radiation and at least one hardening segment.

21 Claims, No Drawings

MIXTURE WHICH CAN BE THERMALLY HARDENED AND HARDENED BY ACTINIC RADIATION AND USE THEREOF

CROSS REFERENCE TO RELATED APPLICATIONS

This application is a National Phase Application of Patent Application PCT/EP02/02838 filed on 14 Mar. 2002, which claims priority to DE 101 15 604.9, filed on 29 Mar. 2001.

The present invention relates to a novel mixture curable thermally and with actinic radiation. The present invention also relates to the use of the novel mixture curable thermally and with actinic radiation as a coating material, adhesive or sealing compound.

Actinic radiation here and below means electromagnetic radiation such as near infrared, visible light, UV radiation or X-rays, especially UV radiation, and corpuscular radiation such as electron beams.

Combined curing by heat and actinic radiation is referred to by those in the art as dual cure. Accordingly, here and below, the novel mixtures, coating materials, adhesives and sealing compounds in question are referred to as dual-cure mixtures, coating materials, adhesives and sealing compounds.

Thermally curable mixtures comprising
    binder mixtures which are free from (meth)acryloyl groups and comprise (meth)acrylate copolymers having low glass transition temperatures Tg and (meth)acrylate copolymers having high glass transition temperatures Tg, and
    unblocked polyisocyanates are known from the European patent EP 0 853 694 B1. The thermally curable mixtures are suitable as clearcoat materials for automotive OEM finishing and give clearcoats having high acid resistance, an excellent topcoat appearance, and good resistance to condensation. They cannot be cured with actinic radiation. Furthermore, the European patent application does not indicate how the profile of properties of the known thermally curable mixtures might be adjusted via the structure of the blocked polyisocyanates. Furthermore, the (meth)acrylate copolymers with low glass transition temperatures Tg must not contain styrene or any styrene derivatives, thereby greatly restricting the variation of the material composition of the (meth)acrylate copolymers in question.

Dual-cure mixtures are known from the German patent application DE 198 18 735 A1. The dual-cure mixtures necessarily include constituents, such as (meth)acrylate copolymers, which besides isocyanate-reactive functional groups mandatorily contain (meth)acryloyl groups, and constituents, such as (meth)acrylate copolymers, for example, which besides complementary free isocyanate groups likewise mandatorily contain (meth)acryloyl groups. Furthermore, they may comprise (meth)acrylate copolymers which are free from (meth)acryloyl groups but contain isocyanate-reactive groups. Over and above this, the German patent application describes a host of alternatives to these components, which are all said to be of equal effect. For example, instead of the (meth)acrylate copolymers which besides isocyanate-reactive functional groups mandatorily contain (meth)acryloyl groups it is possible to use the analogous urethane (meth)acrylates. Moreover, the glass transition temperatures, Tg, which the (meth)acryloyl-free (meth)acrylate copolymers are to have are not stated.

It is indeed stated that the known dual-cure coating materials give coatings having very good chemical, gasoline and solvent resistance, high scratch resistance, and good and rapid sandability, and are said in this respect to satisfy the requirements imposed on a multicoat system in the field of automotive finishing, especially automotive refinish. Furthermore, the coatings are said to be free from cracks and to exhibit good adhesion to the substrate. Overall, they are said to show a flawless visual appearance. But as to how this profile of properties can be optimized and adjusted in detail, and as to which of the virtually innumerable alternatives, which may be inferred from a plurality of lists, are the ones which function best, neither the description nor any example gives specifics.

The German patent application DE 199 20 799 A1 discloses dual-cure mixtures used to produce seals for SMCs (Sheet Molded Compounds) and BMCs (Bulk Molded Compounds). The seals suppress the formation of microbubbles and have a smooth surface free from structures such as orange peel and requiring no aftertreatment; instead, the surfaces can be overcoated easily and safely without any subsequent problems of intercoat adhesion.

The known dual-cure mixture necessarily includes at least one constituent containing at least two functional groups which serve for crosslinking with actinic radiation and at least one functional group which, together with a complementary functional group in another constituent, is able to undergo thermal crosslinking reactions, such as, for example, the isocyanato acrylates known from European patent application EP 0 928 800 A1.

The mixture may comprise, inter alia, at least one urethane (meth)acrylate which is free from isocyanate-reactive functional groups. Furthermore, it may comprise constituents, such as (meth)acrylate copolymers, which contain (meth)acryloyl groups and also, if desired, reactive functional groups for the thermal crosslinking.

Furthermore, the dual-cure mixture may also include thermally curable (meth)acrylate copolymers, to which, however, numerous alternatives are indicated. Moreover, no closer characterization is given of the thermally curable (meth)acrylate copolymers with regard alternatively to their composition, their glass transition temperature Tg, or the amount of reactive functional groups for thermal crosslinking they contain.

Additionally, the dual-cure mixture may comprise blocked polyisocyanates. There is, however, no reference to an intention that blocked or unblocked polyisocyanates which contain at least one soft, flexibilizing segment as a molecular building block should be used with preference.

A comparable dual-cure coating material is known from the German patent application DE 199 20 801 A1. As far as the thermally curable (meth)acrylate copolymers are concerned, all that is stated is that their amount should generally not exceed 40% by weight, based on the coating material. The known dual-cure coating material is used to produce multicoat clearcoat systems which are highly scratch-resistant, weathering-stable, yellowing-free, hard, flexible, and free of surface defects, on all substrates and which also exhibit a high level of adhesion within the clearcoat systems and may be produced in the high coat thickness required for an outstanding overall visual appearance. For this purpose, a film of the dual-cure coating material is overcoated with a further film of the dual-cure coating material which contains nanoparticles, after which the two films are cured together. This process, however, is comparatively complex.

The international patent application WO 98/40170 discloses a dual-cure clearcoat material for a wet-on-wet technique in which a film of a basecoat material is overcoated with a clearcoat material and then the resulting clearcoat film is exposed to actinic radiation before the two films are baked together. The clearcoat material contains, based on its solids content, from 50 to 98% by weight of a system A) which is curable thermally by addition and/or condensation reactions, and is substantially free from free-radically polymerizable double bonds and substantially free from groups reactive in other ways with free-radically polymerizable double bonds of the system B), and from 2 to 50% by weight of a system B) which can be cured by free-radical polymerization of olefinic double bonds on exposure to actinic radiation.

The system A) preferably comprises a hydroxy-functional acrylic binder whose glass transition temperature, however, is not specified. Accordingly, the skilled worker is unable to derive anything from the international patent application regarding the significance of this parameter for the adjustment of the hardness and of the scratch resistance and other important performance properties, such as the chemical resistance, of clearcoats, especially in the shadow zones of three-dimensional substrates of complex shape.

The system B) which can be cured by free-radical polymerization of olefinic double bonds may comprise a hexafunctional aliphatic urethane acrylate with a theoretical molar weight of 800 or 1 000.

The known dual-cure clearcoat material may be a one-component system or a two-component or multicomponent system. It is said to give a clearcoat having an outstanding visual/esthetic appearance. During its production, there is said to be no running from vertical surfaces. The clearcoat is said to exhibit reduced susceptibility to chemicals and scratching, especially to acid and wash scratches.

In order for clearcoats to be able to be used in the esthetically and technologically highly demanding field of automotive finishing, they must be hard and scratch resistant. The scratch resistance may result from the flexibility of the clearcoats, which has the effect that microscratches, as brought about, for example, by the brushes in car wash installations, close up again. Alternatively, the scratch resistance may result from the resilience of the clearcoat, which derives from a high storage modulus. This correlates directly with crosslinking density of the coating.

Although the dual-cure mixtures known to date are able to eliminate this problem to a certain degree, there is to date no entirely satisfactory, simple solution. In particular, it is unknown how and in what amounts the conventional constituents of dual-cure mixtures of the prior art have to be combined specifically with one another in order to give hard and scratch-resistant clearcoats even in the shadow zones of three-dimensional substrates of complex shape, where the clearcoats are also intended to exhibit high chemical resistance, weathering stability, condensation resistance, and intercoat adhesion.

It is an object of the present invention to provide a novel mixture curable thermally and with actinic radiation which no longer has the disadvantages of the prior art. The dual-cure mixture should be easy to prepare and should be suitable for use as a coating material, adhesive or sealing compound. The dual-cure coating materials, adhesives and sealing compounds should be simple to apply and should give coatings, adhesives and seals having a very good profile of performance properties. Where the dual-cure coating materials are used as dual-cure coat materials, they should give hard, flexible, scratch-resistant, chemical-resistant, acid-resistant, water-resistant and weathering-stable clearcoats having an outstanding overall visual appearance and excellent intercoat adhesion. Moreover, they should exhibit good to very good adhesion to customary and known automotive refinishes and to automotive production-line repair finishes, where, as is known, ready-coated bodies are overcoated once again in total with the OEM finishes.

Accordingly, the invention provides the novel mixture curable thermally and with actinic radiation, comprising (A) a binder free from carbon-carbon double bonds activatable with actinic radiation, comprising at least one (meth)acrylate copolymer containing on average per molecule at least one isocyanate-reactive functional group and having a glass transition temperature Tg of from −40 to +80° C., (B) at least one blocked and/or unblocked polyisocyanate having at least one soft, flexibilizing segment, which as a constituent of three-dimensional polymeric networks lowers their glass transition temperature Tg, and (C) at least one unsaturated polyfunctional urethane which is free from isocyanate-reactive functional groups and contains on average per molecule more than four carbon-carbon double bonds activatable with actinic radiation and at least one hardening segment, the hardening segment as a constituent of three-dimensional polymer networks increasing their glass transition temperature Tg.

In the text below, the novel mixture curable thermally and with actinic radiation is referred to as the "dual-cure mixture of the invention".

Further subject matter of the invention will emerge from the description.

In the light of the prior art, it was surprising and unforeseeable for the skilled worker that the object on which the present invention is based could be achieved with the aid of the dual-cure mixture of the invention. A particular surprise was that the dual-cure mixture of the invention, as a one-component system containing blocked polyisocyanates (B), was stable on storage even under extreme climatic conditions or severe climatic fluctuations. The dual-cure mixture could be used both as a one-component system or as a two-component or multicomponent system in the form of a coating material, adhesive or sealing compound, the extremely broad applicability being an even greater surprise. The dual-cure coating materials, adhesives and sealing compounds were easy to prepare and apply and gave coatings, adhesive films and seals having a very good profile of performance properties. When the dual-cure coating materials were used as dual-cure clearcoat materials, they gave hard, flexible, scratch-resistant, chemical-resistant, acid-resistant, water-resistant and weathering-stable clearcoats having an outstanding overall visual appearance and outstanding intercoat adhesion. Furthermore, even in the unsanded state, they have good to very good adhesion to customary finishes and automotive refinishes.

The first key constituent of the novel dual-cure mixture is a binder (A) which is free of carbon-carbon double bonds activatable with actinic radiation. In the context of the present invention, "free of carbon-carbon double bonds" means that the binders (A) in question contain no, or only technically occasioned traces of, such double bonds.

The binder (A) contains at least one, preferably at least two, (meth)acrylate copolymer(s) (A) containing on average per molecule at least one, preferably at least two, with particular preference at least three, and in particular at least four isocyanate-reactive groups.

Examples of suitable isocyanate-reactive functional groups, hereinbelow, are thiol, hydroxyl and primary and secondary amino groups, especially hydroxyl groups.

The (meth)acrylate copolymer (A) or the mixture of at least two (meth)acrylate copolymers (A) has a glass transition temperature Tg of from −40 to +80° C.

Where only one (meth)acrylate copolymer (A) is used, it may have a low or a high glass transition temperature Tg. The (meth)acrylate copolymer (A) preferably has a low glass transition temperature Tg, preferably below room temperature, in particular below 0° C.

In one preferred embodiment the binder (A) comprises at least one, especially one, (meth)acrylate copolymer (A1) and at least one, especially one, (meth)acrylate copolymer (A2), or the binder consists of these (meth)acrylate copolymers (A1) and (A2).

The (meth)acrylate copolymer (A1) contains on average per molecule at least one, preferably at least two, with particular preference at least three, and in particular at least four isocyanate-reactive functional groups and has a glass transition temperature Tg below room temperature, preferably below 0, more preferably below −5, with particular preference below −10, with very particular preference below −15, and in particular below −20° C.

The (meth)acrylate copolymer (A2) contains on average per molecule at least one, preferably at least two, with particular preference at least three, and in particular at least four isocyanate-reactive functional groups and has a glass transition temperature Tg above room temperature, preferably above 30, more preferably above 32, very preferably above 35, with particular preference above 40, with very particular preference above 42, and in particular above 45° C.

Examples of suitable isocyanate-reactive groups for use in the (meth)acrylate copolymers (A1) and (A2) are thiol, hydroxyl and primary and secondary amino groups. The (meth)acrylate copolymers (A1) and (A2) may contain different or identical isocyanate-reactive groups, or combinations of isocyanate-reactive groups, with the number of isocyanate-reactive groups in the (meth)acrylate copolymers (A1), on the one hand, and in the (meth)acrylate copolymers (A2), on the other hand, being identical or different. For example, the (meth)acrylate copolymers (A1) may contain hydroxyl groups and the (meth)acrylate copolymers (A2) may contain secondary and/or primary amino groups. Numerous further permutations are conceivable here, and are easy for the skilled worker to infer, so that there is no need to go into this in detail here.

Preferably, hydroxyl groups are used.

The hydroxyl content of the (meth)acrylate copolymers (A1) and (A2) may vary widely. The lower limit is a result of the proviso that there must be at least one hydroxyl group in the (meth)acrylate copolymers (A1) and (A2). The hydroxyl number is preferably from 50 to 300, more preferably from 80 to 250, very preferably from 100 to 220, with particular preference from 120 to 200, with very particular preference from 140 to 190, and in particular from 150 to 185.

The (meth)acrylate copolymers (A1) and (A2) have an acid number of from 0 to 70, preferably from 3 to 65, more preferably from 5 to 60, with particular preference from 7 to 55, with very particular preference from 10 to 50, and in particular from 12 to 45 mg KOH/g. It is possible for one of the (meth)acrylate copolymers, (A1) or (A2), to have an acid number of 0 mg KOH/g, while the other (meth)acrylate copolymer, (A2) or (A1), has an acid number >0 mg KOH/g. Preferably, the (meth)acrylate copolymers (A1) and (A2) have the same, or approximately the same, acid number.

The weight ratio of (meth)acrylate copolymer (A1) to (meth)acrylate copolymer (A2) may vary widely from one binder (A) to another. Preferably, the weight ratio of (A1) to (A2) is from 1:10 to 10:1, more preferably from 1:8 to 8:1, with particular preference from 1:6 to 6:1, with very particular preference from 1:4 to 4:1, and in particular from 1:2 to 2:1.

It is a particular advantage of the mixture of the invention that the above-described (meth)acrylate copolymers (A1) and (A-2) may also be used individually as binder (A) without any risk of this lessening the advantageous technical effect aimed at in accordance with the invention. Indeed, it is a further, very particular advantage of the mixture of the invention that any, possibly unwanted change in the profile of properties which may be induced by the choice of the binder (A) can easily be compensated, or even overcompensated, by appropriate selection of the blocked or unblocked polyisocyanates (B) described below and/or of the polyfunctional unsaturated urethanes (C) described below.

The above-described (meth)acrylate copolymers (A), including the (meth)acrylate copolymers (A1) and (A2), are prepared by free-radical copolymerization of at least two, preferably at least three and in particular at least four different olefinically unsaturated monomers (a).

One of the monomers (a) is an olefinically unsaturated monomer (a1) by means of which the isocyanate-reactive functional groups are introduced into the (meth)acrylate copolymers (A). At least one of the other monomers (a) substantially comprises olefinically unsaturated monomers (a2) containing no isocyanate-reactive functional groups. These monomers (a2) may be free of reactive functional groups or may contain reactive functional groups which are able to undergo thermal crosslinking reactions with other, complementary reactive functional groups, with the exception of isocyanate groups.

Examples of suitable olefinically unsaturated monomers (a1) are hydroxyalkyl esters of alpha,beta-olefinically unsaturated carboxylic acids, such as hydroxyalkyl esters of acrylic acid, methacrylic acid and ethacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxy-methyl) cyclohexane, octahydro-4,7-methano-1-H-indene-dimethanol or methylpropanediol mono-acrylate, monomethacrylate, monoethacrylate or monocrotonate; or reaction products of cyclic esters, such as epsilon-caprolactone, and these hydroxyalkyl esters;

olefinically unsaturated alcohols such as allyl alcohol;

allyl ethers of polyols, such as trimethylolpropane monoallyl ether or penta-erythritol monoallyl, diallyl or triallyl ether. The monomers (a1) of higher functionality are generally used only in minor amounts. In the context of the present invention, minor amounts of higher-functional monomers here means those amounts which do not lead to crosslinking or gelling of the (meth)acrylate copolymers (A1) and/or (A2), unless the (meth)acrylate copolymers (A1) and/or (A2) are intended to be in the form of crosslinked microgel particles;

reaction products of alpha,beta-olefinically unsaturated carboxylic acids with glycidyl esters of an alpha-branched monocarboxylic acid having from 5 to 18 carbon atoms in the molecule. The reaction of acrylic or methacrylic acid with the glycidyl ester of a carboxylic acid having a tertiary alpha carbon atom may take place before, during or after the polymerization reaction. Preference is given to using, as component (a1), the reaction product of acrylic and/or methacrylic acid with the glycidyl ester of Versatic® acid. This glycidyl ester is available commercially under the name Cardura® E10. For further details, attention is drawn to Römpp Lexikon Lacke und Druckfarben, Georg Thieme Verlag, Stuttgart, N.Y., 1998, pages 605 and 606;

allylamine and crotylamine;

aminoalkyl esters of alpha,beta-olefinically unsaturated carboxylic acids, such as aminoethyl acrylate, aminoethyl methacrylate or N-methylaminoethyl acrylate;

formaldehyde adducts of aminoalkyl esters of alpha,beta-olefinically unsaturated carboxylic acids and of alpha,beta-unsaturated carboxamides, such as N-methylol- and N,N-dimethylol-aminoethyl acrylate, -aminoethyl methacrylate, -acrylamide and -methacrylamide; and also olefinically unsaturated monomers containing acryloxysilane groups and hydroxyl groups, preparable by reacting hydroxy-functional silanes with epichlorohydrin and then reacting the intermediate with an alpha,beta-olefinically unsaturated carboxylic acid, especially acrylic acid and methacrylic acid, or hydroxyalkyl esters thereof.

Of these monomers (a1), the hydroxyalkyl esters, especially the 2-hydroxyethyl, 2-hydroxypropyl, 3-hydroxypropyl, 3-hydroxybutyl, 4-hydroxybutyl esters of acrylic acid and methacrylic acid are of advantage and are therefore used with particular preference.

Examples of suitable olefinically unsaturated monomers (a2) are alpha,beta-olefinically unsaturated carboxylic acids, such as acrylic acid, methacrylic acid, ethacrylic acid, crotonic acid, maleic acid, fumaric acid, itaconic acid, mono(meth)acryloyloxyethyl maleate, mono(meth)acryloyloxyethyl succinate and mono(meth)acryloyloxyethyl phthalate, and also vinylbenzoic acid (all isomers) and alpha-methylvinylbenzoic acid (all isomers), especially acrylic acid and/or methacrylic acid;

alkyl and cycloalkyl esters of alpha,beta-olefinically unsaturated carboxylic acids, phosphonic acids and sulfonic acids, such as (meth)acrylic, crotonic, ethacrylic, vinylphosphonic or vinylsulfonic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate, methacrylate, crotonate, ethacrylate or vinylphosphonate or vinylsulfonate; cycloaliphatic (meth)acrylic, crotonic, ethacrylic, vinylphosphonic or vinylsulfonic esters, especially cyclohexyl, isobornyl, dicyclopentadienyl, octahydro-4,7-methano-1-H-indenemethanol or tert-butylcyclohexyl (meth)acrylate, crotonate, ethacrylate, vinylphosphonate or vinylsulfonate. These may contain, in minor amounts, higher-functional (meth)acrylic, crotonic or ethacrylic alkyl or cycloalkyl esters such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate; trimethylolpropane tri(meth)acrylate; or pentaerythritol tetra(meth)acrylate and also the analogous ethacrylates or crotonates. In the context of the present invention, minor amounts of higher-functional monomers (a2) means amounts which do not lead to crosslinking or gelling of the (meth)acrylate copolymers (A), unless the (meth)acrylate copolymers (A) are to be in the form of crosslinked microgel particles;

allyl ethers of alcohols, such as allyl ethyl ether, allyl propyl ether or allyl n-butyl ether, or of polyols, such as ethylene glycol diallyl ether, trimethylolpropane triallyl ether or pentaerythritol tetraallyl ether. Regarding the higher-functional allyl ethers (a2), the comments made above apply analogously;

olefins such as ethylene, propylene, but-1-ene, pent-1-ene, hex-1-ene, cyclohexene, cyclopentene, norbornene, butadiene, isoprene, cyclopentadiene and/or dicyclopentadiene;

amides of alpha,beta-olefinically unsaturated carboxylic acids, such as (meth)acrylamide, N-methyl-, N,N-dimethyl-, N-ethyl-, N,N-diethyl-, N-propyl-, N,N,-dipropyl-, N-butyl-, N,N-dibutyl- and/or N,N-cyclohexyl-methyl-(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkylstyrenes, especially alpha-methyl-styrene and vinyltoluene, and diphenylethylene or stilbene;

nitriles, such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate, vinyl esters of Versatic® acids, which are sold under the brand name VeoVa® by Deutsche Shell Chemie (for further details, attention is drawn to Römpp Lexikon Lacke und Druckfarben, Georg Thieme Verlag, Stuttgart, N.Y., 1998, page 598 and also pages 605 and 606) and/or the vinyl ester of 2-methyl-2-ethylheptanoic acid; and polysiloxane macromonomers which have a number average molecular weight Mn of from 1 000 to 40 000, preferably from 2 000 to 20 000, with particular preference from 2 500 to 10 000, and in particular from 3 000 to 7 000, and contain on average from 0.5 to 2.5, preferably from 0.5 to 1.5, ethylenically unsaturated double bonds per molecule, as described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12 line 18 to page 18 line 10.

It is generally the case that monomers (a1) and (a2) are selected so that the profile of properties of the (meth)acrylate copolymers (A) is determined essentially by the above-described (meth)acrylate monomers (a1) and (a2), with the monomers (a1) and/or (a2) originating from other monomer classes varying this profile of properties in an advantageously broad and targeted manner. The monomers (a) are selected so as to give the above-described glass transition temperatures Tg and also the hydroxyl numbers and acid numbers.

The skilled worker may select the monomers (a) with the aid of the following formula of Fox, by means of which the glass transition temperatures of polyacrylate resins may be calculated approximately:

$$1/Tg = \sum_{n=1}^{n=x} W_n/Tg_n; \quad \sum_n W_n = 1$$

Tg=glass transition temperature of the (meth)acrylate copolymer
$W_n$=weight fraction of the nth monomer
$Tg_n$=glass transition temperature of the homopolymer of the nth monomer
x=number of different monomers Viewed in terms of its method, the copolymerization has no special features, but instead takes place with the aid of the methods and apparatus as commonly employed for free-radical copolymerization in solution or in bulk in the presence of a free-radical initiator.

Examples of free-radical initiators which may be used are as follows: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; peroxodicarbonates; potassium, sodium or ammonium peroxodisulfate; azo initiators, examples being azo dinitriles such as azobisisobutyronitrile; C—C cleaving initiators such as benzpinacol silyl ethers; or a combination of a nonoxidizing initiator with hydrogen peroxide. It is also possible to use combinations of the above-described initiators. Further examples of suitable initiators are described in the German patent application DE-A-196 28 142 on page 3 line 49 to page 4 line 6.

In the organic solutions or in bulk, the monomers (a) are then copolymerized with the aid of the aforementioned free-radical initiators at reaction temperatures which preferably lie below the lowest decomposition temperature of the respective monomers (a) employed.

Examples of organic solvents are described in "Paints, Coatings and Solvents", Dieter Stoye and Werner Freitag (editors), Wiley-VCH, 2nd edition, 1998, pages 327 to 349.

It is preferred to commence the addition of initiator at a certain time, generally from about 1 to 15 minutes, before adding the monomers. Preference is further given to a process in which the addition of initiator is commenced at the same point in time as the addition of the monomers and ended about half an hour after the addition of the monomers has ended. The initiator is preferably added in a constant amount per unit time. Following the end of the addition of initiator, the reaction mixture is held at polymerization temperature until (generally from 1 to 6 hours) all of the monomers (a) employed have undergone substantially complete reaction. "Substantially complete reaction" is intended to mean that preferably 100% by weight of the monomers used are reacted but that it is also possible for a small residual monomer content of not more than up to about 0.5% by weight, based on the weight of the reaction mixture, to remain unreacted.

Suitable reactors for the copolymerization include the customary and known stirred tanks, stirred tank cascades, tube reactors, loop reactors or Taylor reactors, as described for example in the patent DE 1 071 241 B1, in the patent applications EP 0 498 583 A1 and DE 198 28 742 A1, or in the article by K. Kataoka in Chemical Engineering Science, Volume 50, Number 9, 1995, pages 1409 to 1416.

With regard to the molecular weight distribution, the (meth)acrylate copolymer (A) is not subject to any restrictions whatsoever. Advantageously, however, the copolymerization is carried out so as to give a molecular weight distribution Mw/Mn, measured by means of gel permeation chromatography using polystyrene as standard, of $\leq 4$, preferably $\leq 2$, and in particular $\leq 1.5$, and also, in certain cases, $\leq 1.3$.

The amount of the above-described binders (A) in the dual-cure mixture of the invention may vary widely and depends on the requirements of the case in hand. A key factor here is the functionality of the binder (A) with regard to thermal crosslinking, i.e., the number of isocyanate-reactive groups present in the binder mixture (A). The skilled worker will therefore be able to determine the amount with ease on the basis of his or her general knowledge in the art, with the aid if desired of simple rangefinding experiments. The amount, based on the solids content of the dual-cure mixture of the invention, is preferably from 10 to 80, more preferably from 15 to 75, with particular preference from 20 to 70, with very particular preference from 25 to 65, and in particular from 30 to 60% by weight.

The dual-cure mixture of the invention further comprises at least one blocked or unblocked polyisocyanate (B) which includes at least one soft, flexibilizing segment, which, as a constituent or building block of three-dimensional polymeric networks, lowers their glass transition temperature Tg.

The soft, flexibilizing segments are divalent organic radicals.

Examples of suitable soft, flexibilizing, divalent organic radicals are substituted or unsubstituted, preferably unsubstituted, linear or branched, preferably linear, alkanediyl radicals having from 4 to 30, preferably from 5 to 20 and in particular 6 carbon atoms, which within the carbon chain may also contain cyclic groups.

Examples of highly suitable linear alkanediyl radicals are tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, penta-decane-1,15-diyl, hexadecane-1,16-diyl, heptadecane-1,17-diyl, octadecane-1,18-diyl, nonadecane-1,19-diyl or eicosane-1,20-diyl, preferably tetramethylene, pentamethylene, hexamethylene, heptamethylene, octamethylene, nonane-1,9-diyl, decane-1,10-diyl, especially hexamethylene.

Examples of highly suitable alkanediyl radicals which also contain cyclic groups in the carbon chain are 2-heptyl-1-pentylcyclohexane-3,4-bis(non-9-yl), cyclohexane-1,2-, -1,4- or -1,3-bis(methyl), cyclohexane-1,2-, -1,4- or -1,3-bis (eth-2-yl), cyclohexane-1,3-bis(prop-3-yl) or cyclohexane-1,2-, -1,4- or -1,3-bis(but-4-yl).

Further examples of suitable divalent organic radicals are divalent polyester radicals comprising repeating polyester units of the formula —(—CO—(CHR$^1$)$_m$—CH$_2$—O—)—. In this formula the index m is preferably from 4 to 6 and the substituent R$^1$ is hydrogen or an alkyl, cycloalkyl or alkoxy radical. No one substituent contains more than 12 carbon atoms.

Further examples of suitable divalent organic radicals are divalent linear polyether radicals, preferably having a number average molecular weight of from 400 to 5 000, in particular from 400 to 3 000. Highly suitable polyether radicals have the general formula —(—O—(CHR$^2$)$_o$—)$_p$ O—, where the substituent R$^2$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyether radicals derived from poly(oxyethylene) glycols, poly(oxypropylene)glycols and poly(oxybutylene)glycols.

Also suitable, furthermore, are linear divalent siloxane radicals, as present, for example, in silicone rubbers; hydrogenated polybutadiene or polyisoprene radicals, random or alternating butadiene-isoprene copolymer radicals or butadiene-isoprene graft copolymer radicals, which may also contain styrene in copolymerized form, and also ethylene-propylene-diene radicals.

Suitable substituents include all organic functional groups that are substantially inert, i.e., which do not undergo reactions with constituents of the novel dual-cure mixtures.

Examples of suitable inert organic radicals are alkyl groups, especially methyl groups, halogen atoms, nitro groups, nitrile groups or alkoxy groups.

Of the above-described divalent organic radicals, the alkanediyl radicals containing no cyclic groups in the carbon chain are of advantage and are therefore used with preference.

In the blocked or unblocked polyisocyanates (B) it is possible for only one kind of the above-described soft, flexibilizing, divalent organic radicals to be present. However, it is also possible to use at least two different divalent organic radicals.

Examples of highly suitable polyisocyanates (B) also suitable for preparing the blocked polyisocyanates (B) are acylic aliphatic diisocyanates such as trimethylene diisocyanate, tetramethylene diisocyanate, penta-methylene diisocyanate, hexamethylene diisocyanate, heptamethylene diisocyanate, ethylethylene diisocyanate, trimethylhexane diisocyanate or acyclic aliphatic diisocyanates containing cyclic groups in their carbon chain, such as diisocyanates derived from difatty acids, as sold under the commercial designation DDI 1410 from Henkel and described in the patents WO 97/49745 and WO 97/49747, especially 2-heptyl-3,4-bis(9-isocyanatononyl)-1-pentylcyclohexane, or 1,2-, 1,4- or 1,3-bis(isocyanatomethyl)cyclohexane, 1,2-, 1,4- or 1,3-bis(2-isocyanatoeth-1-yl)cyclohexane, 1,3-bis(3-isocyanatoprop-1-yl)cyclohexane or 1,2-, 1,4- or 1,3-bis(4-isocyanatobut-1-yl)cyclohexane. In the context of the present invention, owing to their two isocyanate groups attached exclusively to alkyl groups and despite their cyclic groups, the latter are included among the acylic aliphatic diisocyanates.

Of these acyclic aliphatic diisocyanates (B), particular advantage is possessed by those containing no cyclic groups in their carbon chain. Of these, in turn, hexamethylene diisocyanate is especially advantageous and is therefore used with very particular preference.

Further examples of suitable polyisocyanates (B) also suitable for preparing blocked polyisocyanates (B) are the oligomers of the aforementioned diisocyanates, especially of hexamethylene diisocyanate, that contain isocyanurate, urea, urethane, biuret, uretdione, iminooxadiazinedione, carbodiimide and/or allophanate groups. Examples of suitable preparation processes are known from the patents CA 2,163, 591 A, U.S. Pat. No. 4,419,513 A, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258 482 A1, U.S. Pat. No. 5,290,902 A1, EP 0 649 806 A1, DE 42 29 183 A1 and EP 0 531 820 A1 or are described in the German patent application DE 100 05 228.2, unpublished at the priority date of the present specification.

Also suitable are the highly viscous polyisocyanates (B) as described in the German patent application DE 198 28 935 A1, or the polyisocyanate particles surface-deactivated by urea formation and/or blocking, as per the European patent applications EP 0 922 720 A1, EP 1 013 690 A1 and EP 1 029 879 A1.

Additionally suitable as polyisocyanates (B) are the adducts, described in the German patent application DE 196 09 617 A1, of polyisocyanates with dioxanes, dioxolanes and oxazolidines which contain isocyanate-reactive functional groups and still contain free isocyanate groups.

Examples of suitable blocking agents for preparing the blocked polyisocyanates (B) are the blocking agents from the U.S. patent U.S. Pat. No. 4,444,954 A or U.S. Pat. No. 5,972,189 A, such as i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, propylene glycol monomethyl ether, methoxymethanol, 2-(hydroxyethoxy)phenol, 2-(hydroxypropoxy)phenol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

iv) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

v) acid amides such as acetoanilide, acetoanisidinamide, acrylamide, methacrylamide, acetamide, stearamide or benzamide;

vi) imides such as succinimide, phthalimide or maleimide;

vii) amines such as diphenylamine, phenylnaphthylamine, xylidine, N-phenylxylidine, carbazole, aniline, naphthylamine, butylamine, dibutylamine or butylphenylamine;

viii) imidazoles such as imidazole or 2-ethylimidazole;

ix) ureas such as urea, thiourea, ethyleneurea, ethylenethiourea or 1,3-diphenylurea;

x) carbamates such as phenyl N-phenylcarbamate or 2-oxazolidone;

xi) imines such as ethyleneimine;

xii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiii) salts of sulfurous acids such as sodium bisulfite or potassium bisulfite;

xiv) hydroxamic esters such as benzyl methacrylohydroxamate (BMH) or allyl methacrylohydroxamate; or xv) substituted pyrazoles, ketoximes, imidazoles or triazoles; and also xvi) mixtures of these blocking agents, especially dimethylpyrazole and triazoles, dimethylpyrazole and succinimide, or butyl diglycol and trimethylolpropane.

The amount of blocked and/or unblocked polyisocyanates (B) in the dual-cure mixtures of the invention may vary widely and is guided in particular by the functionality of the binder mixtures (A) in respect of thermal curing, i.e., the number of isocyanate-reactive functional groups they contain. The skilled worker is therefore able in each individual case to determine the optimum amount with ease on the basis of his or her general knowledge in the art, with the aid if desired of simple preliminary experiments. Preferably, the amount of blocked and/or unblocked polyisocyanates (B), based in each case on the solids of the dual-cure mixture of the invention, is from 10 to 70, more preferably from 15 to 65, with particular preference from 20 to 60, with very particular preference from 25 to 55, and in particular from 30 to 50% by weight.

Furthermore, the dual-cure mixture of the invention comprises at least one unsaturated polyfunctional urethane (C).

The unsaturated polyfunctional urethane (C) is free from isocyanate-reactive functional groups. It contains on average per molecule more than four, preferably at least five, in particular six, carbon-carbon double bonds activatable with actinic radiation. It further comprises at least one hardening segment as a building block of the molecule. As a constituent of three-dimensional polymeric networks, the hardening segment increases their glass transition temperature Tg.

The term "polyfunctional" indicates that the urethane (C) contains at least two urethane groups.

Following their activation with actinic radiation, the carbon-carbon double bonds bring about the dimerization, oligomerization or polymerization of the olefinically unsaturated groups in question.

Highly suitable carbon-carbon double bonds are present, for example, in (meth)acryloyl, ethacryloyl, crotonate, cinnamate, vinyl ether, vinyl ester, ethenylarylene, dicyclopentadienyl, norbornenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclopentadienyl ester, norbornenyl ester, isoprenyl ester, isopropenyl ester, allyl ester or butenyl ester groups. Of these, (meth)acryloyl groups, especially acryloyl groups, are of particular advantage, and so are used with very particular preference in accordance with the invention.

Accordingly, the polyfunctional unsaturated urethane (C) used with preference in accordance with the invention comprises a urethane (meth)acrylate.

The hardening segments are divalent or higher multivalent organic radicals. It is preferred to use divalent organic radicals. Alongside these in minor amounts it is possible to use multivalent, especially trivalent, organic radicals, by means of which it is possible to influence the crosslinking density.

Examples of highly suitable hardening segments are divalent aromatic, cycloaliphatic and aromatic-cycloaliphatic radicals, in the case of which within the polyfunctional unsaturated urethane (C), at least one linking bond leads directly to the cycloaliphatic and/or aromatic structural unit. Preferably, both linking bonds lead to these structural units.

The divalent cycloaliphatic and aromatic radicals, especially the cycloaliphatic radicals, are advantageous and are used with preference.

Examples of suitable divalent aromatic radicals are substituted, especially methyl-substituted, or unsubstituted aromatic radicals having from 6 to 30 carbon atoms in the molecule, such as phen-1,4-, -1,3- or -1,2-ylene, naphth-1,4-, -1,3-, -1,2-, -1,5- or -2,5-ylene, propane-2,2-di(phen-4'-yl), methanedi(phen-4'-yl), diphenyl-4,4'-diyl or 2,4- or 2,6-tolylene.

Examples of suitable divalent cycloaliphatic radicals are substituted or unsubstituted, preferably unsubstituted, cycloalkanediyl radicals having from 4 to 20 carbon atoms, such as cyclobutane-1,3-diyl, cyclopentane-1,3-diyl, cyclohexane-1,3- or -1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4''-diyl, especially 3,3,5-trimethylcyclohexane-1,5-diyl or dicyclohexylmethane-4,4'-diyl. Besides these, it is possible in minor amounts to employ the corresponding triyl radicals.

Examples of suitable substituents are those described above.

In principle, the unsaturated polyfunctional urethanes (C) are preparable by reacting a diisocyanate or polyisocyanate with a chain extender from the group of the diols/polyols and/or diamines/polyamines and/or dithiols/polythiols and/or alkanolamines and then reacting the remaining free isocyanate groups with at least one compound containing at least one, especially one, of the above-described isocyanate-reactive groups, especially hydroxyl groups, and also at least one, especially one, carbon-carbon double bond.

Highly suitable double bonds are present in the olefinically unsaturated groups described above. Of these, (meth)acryloyl groups, especially acryloyl groups, are of particular advantage, and so are used with very particular preference in accordance with the invention.

Highly suitable compounds for introducing carbon-carbon double bonds are the monomers (a1) and (a2) described above, especially acrylic acid and methacrylic acid.

The hardening segments may be introduced both by way of the diisocyanates or polyisocyanates and also by way of the chain extenders.

Highly suitable diisocyanates and polyisocyanates are aromatic and cycloaliphatic, especially cycloaliphatic, diisocyanates and polyisocyanates. Diisocyanates and polyisocyanates considered aromatic and cycloaliphatic are those in which at least one isocyanate group is attached directly to an aromatic or cycloaliphatic structural unit.

Examples of suitable cycloaliphatic diisocyanates or polyisocyanates for introducing the hardening segments are isophorone diisocyanate (=5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, dicyclohexylmethane 2,4'-diisocyanate or dicyclohexylmethane 4,4'-diisocyanate, especially isophorone diisocyanate, and also the oligomers of these diisocyanates, especially of isophorone diisocyanate, that contain isocyanurate, urea, urethane, biuret, uretdione, iminooxadiazinedione, carbodiimide and/or allophanate groups.

Examples of suitable aromatic diisocyanates and polyisocyanates are 2,4- and 2,6-tolylene diisocyanate, 1,2-, 1,3- or 1,4-phenylene diisocyanate, naphthalene 1,4-, 1,3-, 1,2-, 1,5- or 2,5-diisocyanate, propane-2,2-di(phenyl 4'-diisocyanate), methanedi(phenyl 4'-isocyanates) or 1,1'-diphenyl-4,4'-diisocyanate.

Examples of suitable chain extenders for introducing hardening segments are cyclobutane-1,3-diol, cyclopentane-1,3-diol, cyclohexane-1,3- or -1,4-diol, cycloheptane-1,4-diol, norbornane-1,4-diol, adamantane-1,5-diol, decalindiol, 3,3,5-trimethylcyclohexane-1,5-diol, 1-methylcyclohexane-2,6-diol, dicyclohexylmethane-4,4'-diol, 1,1'-dicyclohexane-4,4'-diol or 1,4-dicyclohexylhexane-4,4''-diol, especially 3,3,5-trimethylcyclohexane-1,5-diol or dicyclohexylmethane-4,4'-diol.

Preferably, the hardening segments are incorporated into the unsaturated polyfunctional urethanes (C) by way of the diisocyanates and polyisocyanates.

Examples of suitable chain extenders which contain no hardening segments are described in the German patent application DE 199 14 896 A1, in the German patent application DE 44 21 823 A1, page 7 line 65 to page 8 lines 2 to 45, and page 10 lines 42 to 48, or in the European patent application EP 0 089 497, page 8 line 17 to page 9 line 1.

The amounts of chain extenders, di- and polyisocyanates and compounds containing on average at least one isocyanate-reactive group and at least one carbon-carbon double bond, especially hydroxyalkyl (meth)acrylates, are preferably chosen so that 1. the equivalents ratio of the NCO groups to the isocyanate-reactive groups of the chain extender is between 3:1 and 1:2, and is preferably 2:1, and
2. the isocyanate-reactive groups of the compounds containing on average per molecule at least one isocyanate-reactive group and at least one carbon-carbon double bond, especially hydroxyalkyl (meth)acrylates, are present in a stoichiometric amount in relation to the remaining free isocyanate groups of the prepolymer formed from isocyanate and chain extender.

A further possibility is to prepare the unsaturated polyfunctional urethanes (C) by first reacting some of the isocyanate groups of a di- or polyisocyanate with at least one compound containing at least one isocyanate-reactive group and at least one carbon-carbon double bond in the molecule, especially a hydroxyalkyl (meth)acrylate, and then reacting the remaining isocyanate groups with a chain extender. In this case too, the amounts of chain extender, isocyanate and compound are chosen so that the equivalents ratio of the NCO groups to the isocyanate-reactive groups of the chain extender is between 3:1 and 1:2, and is preferably 2:1, and the equivalents ratio of the remaining NCO groups to the isocyanate-reactive groups of the compound is 1:1. Of course, all forms lying between these two processes are also possible. For example, some of the isocyanate groups of a diisocyanate may first be reacted with a diol as chain extender, after which a further portion of the isocyanate groups may be reacted with the compound, especially the hydroxyalkyl (meth)acrylate, and subsequently the remaining isocyanate groups may be reacted with a diamine as chain extender.

These various preparation processes for the urethane (meth)acrylates (C) used inventively with preference are known, for example, from the European patent application EP 0 204 161 A1. The urethane (meth)acrylates (C) are commercially customary compounds and are sold, for example, under the brand name Ebecryl® 1290 by UCB, Belgium.

The amount of the unsaturated polyfunctional urethanes (C) in the novel dual-cure mixtures may vary widely and is guided by the requirements of the case in hand, in particular by the crosslinking density to be established in the seals, adhesive films and coatings of the invention that are produced from the novel dual-cure mixtures. The amount, based in each case on the solids of the novel dual-cure mixture, is preferably from 5 to 50, more preferably from 8 to 45, with particular preference from 10 to 40, with very particular preference from 12 to 35, and in particular from 14 to 30% by weight.

The novel dual-cure mixtures may further comprise at least one additive (D), depending on their intended use.

For example, where they are to be used as pigmented coating materials, especially surfacers, solid-color topcoats or basecoats, they may comprise color and/or effect pigments, electrically conductive pigments, magnetically shielding pigments and/or fluorescent pigments, metal powders, organic dyes or fillers (D). The pigments may be organic or inorganic in nature.

Examples of suitable effect pigments are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, platelet-shaped effect pigments based on iron oxide with a shade from pink to brownish red, or liquid-crystalline effect pigments, for example. For further details, attention is drawn to Römpp Lexikon Lacke und Druckfarben, Georg Thieme Verlag, 1998, page 176, "Effect pigments", and pages 380 and 381, "Metal oxidemica pigments" to "Metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A and U.S. Pat. No. 5,244,649 A.

Examples of suitable inorganic color pigments are white pigments such as titanium dioxide, zinc white, zinc sulfide or lithophones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet or manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, attention is drawn to Römpp Lexikon Lacke und Druckfarben, Georg Thieme Verlag, 1998, pages 180 and 181, "Iron blue pigments" to "Black iron oxide", pages 451 to 453, "Pigments" to "Pigment volume concentration", page 563, "Thioindigo pigments", page 567, "Titanium dioxide pigments", pages 400 and 467, "Naturally occurring pigments", page 459, "Polycyclic pigments", page 52, "Azomethine pigments", "Azo pigments", and page 379, "Metal complex pigments".

Examples of fluorescent pigments (daylight-fluorescent pigments) are bis(azomethine)pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys, such as aluminum, zinc, copper, bronze or brass.

Suitable organic dyes are lightfast organic dyes having little or no tendency to migrate from the novel dual-cure mixtures and the products produced from them. The migration tendency may be estimated by the skilled worker on the basis of his or her general knowledge in the art and/or with the aid of simple preliminary rangefinding tests, as part of tinting experiments, for example.

Examples of suitable organic and inorganic fillers are chalk, calcium sulfates, barium sulfate, silicates such as talc, mica or kaolin, silicas, oxides such as aluminum hydroxide, magnesium hydroxide or organic fillers such as polymer powders, especially those of polyamide or polyacrylonitrile. For further details, attention is drawn to Römpp Lexikon Lacke und Druckfarben, Georg Thieme Verlag, 1998, pages 250 ff., "Fillers".

It is of advantage to use mixtures of platelet-shaped inorganic fillers such as talc, mica and non-platelet-shaped inorganic fillers such as chalk, dolomite, calcium sulfates, or barium sulfate, since by this means the viscosity and rheology may be adjusted very effectively.

Examples of suitable transparent fillers are those based on silicon dioxide, aluminum oxide or zirconium oxide, but especially nanoparticles on this basis. These transparent fillers may also be present in the unpigmented coating materials of the invention, such as clearcoat materials.

Additives (D) which may be present both in pigmented and in the unpigmented novel coating materials are

- additional crosslinking agents, such as amino resins, as described for example in Römpp Lexikon Lacke und Druckfarben, Georg Thieme Verlag, 1998, page 29, "Amino resins", in the textbook "Lackadditive" [Additives for coatings] by Johan Bieleman, Wiley-VCH, Weinheim, N.Y., 1998, pages 242 ff., in the book "Paints, Coatings and Solvents", second, completely revised edition, edited by D. Stoye and W. Freitag, Wiley-VCH, Weinheim, N.Y., 1998, pages 80 ff., in the patents U.S. Pat. No. 4,710,542 A or EP 0 245 700 A1, and also in the article by B. Singh and coworkers, "Carbamylmethylated Melamines, Novel Crosslinkers for the Coatings Industry", in Advanced Organic Coatings Science and Technology Series, 1991, Volume 13, pages 193 to 207; carboxyl-containing compounds or resins, as described for example in the patent DE 196 52 813 A1, compounds or resins containing epoxide groups, as described for example in the patents EP 0 299 420 A1, DE 22 14 650 B1, DE 27 49 576 B1, U.S. Pat. No. 4,091,048 A or U.S. Pat. No. 3,781,379 A; blocked and unblocked polyisocyanates other than the blocked and unblocked polyisocyanates (B) and/or tris(alkoxycarbonylamino)triazines, as known from the patents U.S. Pat. No. 4,939,213 A, U.S. Pat. No. 5,084,541 A, U.S. Pat. No. 5,288,865 A or EP 0 604 922 A;
- other radiation-curable constituents, such as (meth)acryloyl-functional (meth)acrylic copolymers, polyether acrylates, polyester acrylates, unsaturated polyesters, epoxy acrylates, urethane acrylates other than the unsaturated polyfunctional urethanes (C), amino acrylates, melamine acrylates, silicone acrylates and the corresponding methacrylates;
- additional customary and known binders other than the (meth)acrylate copolymers (A1) and (A2) for use in accordance with the invention, such as oligomeric and polymeric, thermally curable, linear and/or branched and/or block, comb and/or random poly(meth)acrylates or acrylic copolymers, especially those described in the patent DE 197 36 535 A1; polyesters; those described in the patents DE 40 09 858 A1 or DE 44 37 535 A1, alkyds, acrylated polyesters; polylactones; polycarbonates; polyethers; epoxy resin-amine adducts; (meth) acrylatediols; partially saponified polyvinyl esters; polyurethanes and acrylated polyurethanes, especially those described in the patent applications EP 0 521 928 A1, EP 0 522 420 A1, EP 0 522 419 A1, EP 0 730 613 A1 or DE 44 37 535 A1; or polyureas;
- typical coatings additives, such as thermally curable reactive diluents (cf. the German patent applications DE 198 09 643 A1, DE 198 40 605 A1 or DE 198 05 421 A1) or reactive diluents curable with actinic radiation (cf. Römpp Lexikon Lacke und Druckfarben, Stuttgart, N.Y., 1998, page 491), low-boiling organic solvents and/or high-boiling organic solvents ("long solvents"), UV absorbers, light stabilizers, free-radical scavengers, thermolabile free-radical initiators, photoinitiators, crosslinking catalysts, devolatilizers, slip additives, polymerization inhibitors, defoamers, emulsifiers, wetting agents, adhesion promoters, leveling agents, film formation auxiliaries, rheology control additives, sag control agents (cf. the patent applications DE 199 24 172 A1, DE 199 24 171 A, EP 0 192 304 A1, DE 23 59 923 A1, DE 18 05 693 A1, WO 94/22968, DE 27 51 761 C1, WO 97/12945 or "farbe+lack", November 1992, pages 829 ff.); or flame retardants; further examples of suitable coatings additives are described in the textbook "Lackadditive" by Johan Bieleman, Wiley-VCH, Weinheim, N.Y., 1998.

The above-described additives (D) may also be present in the dual-cure adhesives and sealing compounds of the invention, provided they are suitable for these end uses, which is something that the skilled worker may readily ascertain on the basis of his or her general knowledge in the art.

The preparation of the dual-cure mixtures of the invention has no special features but instead takes place in a customary and known manner by mixing of the above-described constituents in suitable mixing equipment, such as stirred vessels, dissolvers, stirred mills, static mixers, toothed-wheel dispersers or extruders, in accordance with the techniques suitable for preparing the respective dual-cure mixtures, preferably in the absence of actinic radiation.

Depending on their intended use, the dual-cure mixtures of the invention may be present as dispersions and/or solutions in organic solvents or in the form of a substantially or completely solvent-free mixture. The substantially or complete solvent-free mixture may be present in liquid forms (100% system) or powder form. Preferably, the dual-cure mixtures of the invention are present as dispersions and/or solutions in organic solvents.

The novel dual-cure powder slurries are outstandingly suitable as, or to prepare, dual-cure coating materials, adhesives and sealing compounds. The novel dual-cure coating materials are outstandingly suitable for the production of single-coat or multicoat, color and/or effect, electrically conductive, magnetically shielding or fluorescent coatings, such as primer-surfacer coats, basecoats, or solid-color topcoats or of single-coat or multicoat clearcoats. The dual-cure adhesives of the invention are outstandingly suitable for producing adhesive films, and the dual-cure sealing compounds of the invention are outstandingly suitable for producing seals.

Very particular advantages result when the novel dual-cure mixtures are used as clearcoat materials for producing single-coat or multicoat clearcoats. In particular, the novel dual-cure clearcoat materials are used to produce multicoat color and/or effect coating systems by the wet-on-wet technique, in which a basecoat material, especially an aqueous basecoat material, is applied to the surface of the substrate, after which the resulting basecoat film is dried, without being cured, and is overcoated with a clearcoat film. Subsequently, the two films are cured together.

In terms of method, the application of the novel dual-cure coating materials, adhesives and sealing compounds has no special features, but may instead take place by any customary application method, such as spraying, knifecoating, brushing, flow coating, dipping, trickling or rolling, for example. In the case of the dual-cure coating materials of the invention it is preferred to employ spray application methods, such as compressed air spraying, airless spraying, high-speed rotation, electrostatic spray application (ESTA), alone or in conjunction with hot spray applications such as hot air spraying, for example. Preferably, application takes place in the absence of daylight, in order to prevent premature crosslinking of the novel dual-cure mixtures.

Suitable substrates are all those whose surface is undamaged by the conjoint use of actinic radiation and heat for curing the dual-cure films present thereon. The substrates preferably consist of metals, plastics, wood, ceramic, stone, textile, fiber composites, leather, glass, glass fibers, glass wool and rockwool, mineral-bound and resin-bound building materials, such as plasterboard and cement slabs or roof tiles, and composites of these materials.

Accordingly, the novel dual-cure coating materials, adhesives and sealing compounds are not only outstandingly suitable for applications in the fields of automotive OEM finishing and automotive refinish, but are also suitable for the coating, bonding and sealing of buildings, inside and out, and of doors, windows and furniture, for industrial coating, including coil coating, container coating and the impregnation and/or coating of electrical components, and also for the coating of white goods, including domestic appliances, boilers and radiators. In the context of industrial coatings, they are suitable for coating, bonding or sealing of virtually all parts and articles for private or industrial use, such as domestic appliances, small metal parts such as nuts and bolts, hubcaps, wheel rims, packaging, or electrical components, such as motor windings or transformer windings.

In the case of electrically conductive substrates, it is possible to use primers which are prepared in a customary and known manner from electrodeposition coating materials. Both anodic and cathodic electrodeposition coating materials are suitable for this purpose, but especially cathodic electrodeposition coating materials. Nonfunctionalized and/or nonpolar plastics surfaces may be subjected prior to coating in a known manner to a pretreatment, such as with a plasma or by flaming, or provided with a water-based primer.

The curing of the applied dual-cure mixtures of the invention also has no special features in terms of its method but instead takes place in accordance with the customary and known thermal methods, such as heating in a forced air oven or irradiation using IR lamps.

Suitable radiation sources for curing with actinic radiation are sources such as high or low pressure mercury vapor lamps, with or without lead doping in order to open up a radiation window of up to 405 nm, or electron beam sources. Further examples of suitable processes and equipment for curing with actinic radiation are described in the German patent application DE 198 18 735 A1, column 10 lines 31 to 61.

The resulting novel coatings, especially the single-coat or multicoat color and/or effect coatings and clearcoats of the invention, are easy to produce and have outstanding optical properties and very high light stability, chemical resistance, water resistance and weathering stability. In particular, they are free from clouding and inhomogeneities. Moreover, they are hard, flexible and scratch resistant. They possess outstanding intercoat basecoat/clearcoat adhesion and good to very good adhesion to customary and known automotive refinishes and to automotive production-line repair finishes. As is known, in the case of automotive production-line repair finishing, the ready-painted bodies are coated once again with the OEM finishes.

The adhesive films of the invention connect a very wide variety of substrates to one another firmly and durably and have a high chemical and mechanical stability even under extreme temperatures and/or temperature fluctuations.

Similarly, the seals of the invention provide durable sealing of the substrates, and exhibit high mechanical and chemical stability even under extreme temperatures and/or temperature fluctuations, and even in conjunction with exposure to aggressive chemicals.

Accordingly, the primed or unprimed substrates commonly employed in the technological fields recited above and coated with at least one novel coating, bonded with at least one novel adhesive film and/or sealed with at least one novel seal combine a particularly advantageous profile of performance properties with a particularly long service life, which makes them particularly attractive economically.

EXAMPLES

Preparation Example 1

The Preparation of a Methacrylate Copolymer (A1)

A suitable laboratory reactor equipped with stirrer, reflux condenser and two feed vessels was charged with 48 parts by weight of Solventnaphtha® and this initial charge was heated to 160° Celsius. Subsequently, from the first feed vessel, a monomer mixture of 44.5 parts by weight of ethylhexyl acrylate, 10 parts by weight of styrene, 27 parts by weight of hydroxyethyl methacrylate and 15 parts by weight of 4-hydroxybutyl acrylate and 3.5 parts by weight of acrylic acid was metered in over the course of four hours, and from the second feed vessel a solution of 8.0 parts by weight of tert-butyl peroxyethylhexanoate and 6 parts by weight of Solventnaphtha® was metered in over the course of four and a half hours, both feeds taking place at a uniform rate and with stirring. The feeds were commenced simultaneously. After the end of the second feed (initiator feed), the reaction mixture was polymerized at 160° C. for two hours more. This gave a solution of the methacrylate copolymer (A1) having a solids content of 60.4% by weight (one hour/130° C.) with an acid number of 24.3 mg KOH/g solids and a hydroxyl number of 175 mg KOH/g solids. The methacrylate copolymer (A1) had a glass transition temperature, Tg, of −22° C.

Preparation Example 2

The Preparation of a Methacrylate Copolymer (A2)

Preparation example 1 was repeated except that 61 parts by weight of Solventnaphtha® were used as the initial charge and the initiator feed added was a solution of 4.5 parts by weight of tert-butyl peroxyethylhexanoate and 6 parts by weight of Solventnaptha® and the monomer feed used was a monomer mixture of 10 parts by weight of styrene, 31.5 parts by weight of tert-butyl acrylate, 15 parts by weight of n-butyl methacrylate, 40 parts by weight of hydroxypropyl methacrylate and 3.5 parts by weight of acrylic acid. This gave a solution of the methacrylate copolymer (A2) having a solids content of 58.6% by weight (one hour/130° C.) with an acid number of 27.5 mg KOH/g solids and a hydroxyl number of 156 mg KOH/g solids. The methacrylate copolymer (A2) had a glass transition temperature, Tg, of +65° C.

Example 1

The Preparation of an Inventive Dual-cure Clearcoat Material

The inventive dual-cure clearcoat material-was prepared by mixing and homogenizing the following constituents:
- 53.1 parts by weight of the solution of the methacrylate copolymer (A1) from preparation example 1,
- 61.4 parts by weight of the solution of the methacrylate copolymer (A2) from preparation example 2,
- 70.8 parts by weight of an 80% strength solution in methyl ethyl ketone of a 2,5-dimethylpyrazole-blocked hexamethylenediisocyanate,
- 31.8 parts by weight of an aliphatic urethane acrylate based on isophorone diisocyanate and containing 6 acrylate groups in the molecule (Ebecryl® 1290 from UCB, Belgium),
- 1.27 parts by weight of a photoinitiator mixture comprising Irgacure® 184 and Irgacure® 819 in a ratio of 7:1,
- 1.5 parts by weight of a light stabilizer (Tinuvin® 400, UV absorber from Ciba Specialty Chemicals), and
- 1.5 parts by weight of a reversible free-radical scavenger based on a sterically hindered amine (HALS) (Tinuvin® 292 from Ciba Specialty Chemicals).

The inventive dual-cure clearcoat material was stable on storage and in transit.

Example 2

The Production of a Multicoat Color and/or Effect Coating System with an Inventive Clearcoat To produce the multicoat system, steel test panels which have been coated with an electrocoat in a dry film thickness of from 18 to 22 µm were coated with a water-based primer-surfacer. The resulting primer-surfacer film was baked at 160° C. for 20 minutes to give a primer-surfacer coat with a dry film thickness of from 35 to 40 µm. The primer-surfacer coat was subsequently coated with an aqueous basecoat material from BASF Coatings AG (MB 9040) in a film thickness of from 12 to 15 µm. The resultant aqueous basecoat films were flashed off at 80° C. for 10 minutes. Thereafter the clearcoat material of example 1 was applied pneumatically using a gravity-feed gun in one cross pass in a film thickness of from 40 to 45 µm. Subsequently, the clearcoat films were flashed off at room temperature for 10 minutes and at 80° C. for 10 minutes. The flashed-off clearcoat films were cured first with UV radiation (dose: 1 500 mJ/cm$^2$; belt speed 4 m/min). Subsequently, the aqueous basecoat films and the clearcoat films were cured thermally in a forced air oven at 155° C. for 30 minutes.

The chemical resistance was determined with the aid of the MB gradient oven test, known in the art, following aging of the multicoat systems at room temperature for 72 hours. In this test, marking first occurred at 51° C. for 1% strength sulfuric acid, at 48° C. for pancreatin, at 61° C. for tree resin, and not until more than 72° C. for deionized water.

The inventive multicoat system had a gloss to DIN 67530 of 90.

The scratch resistance was determined with the aid of the Amtec test, which is known in the art, following aging of the inventive multicoat systems at room temperature for seven days. The result was a decrease in the degree of gloss (20°) of 22.7.

The micropenetration hardness was determined separately on an inventive clearcoat. It was 181 N/mm$^2$ (universal hardness at 25.6 mN, Fischerscope 100 V with Vickers diamond pyramid).

The maximum of the loss factor tan δ and the storage modulus E' of the clearcoat material and, respectively, of the clearcoat were determined with the aid of the DMTA method, as described in detail in the German patent DE 197 09 467 C1, in the article by Th. Frey, K.-H, Große-Brinkhaus, U. Röckrath, Cure Monitoring of Thermoset Coatings, Progress In Organic Coatings, Volume 27 (1996), pages 59 to 66, or in the German patent application DE 44 09 715 A1. The maximum of the loss factor tan δ was at 86° C., and the storage modulus E' was $4.8 \times 10^7$ Pa, i.e., within the plastic range.

The test results underline the outstanding visual properties, the high chemical and water resistance, the high flexibility and hardness, and the very good scratch resistance of the inventive clearcoats.

Preparation Example 3

The Preparation of a Methacrylate Copolymer for Use in a Thixotropic Paste

A laboratory reactor with a capacity of 4 l, equipped with a stirrer, two dropping funnels for the monomer mixture and initiator solution respectively, a nitrogen inlet pipe, a thermometer and a reflux condenser, was charged with 720 g of an aromatic hydrocarbon fraction having a boiling range of 158–172° C. The solvent was heated to 140° C. After it had reached 140° C., a monomer mixture of 450 g of 2-ethylhexyl methacrylate, 180 g of n-butyl methacrylate, 210 g of styrene, 180 g of hydroxyethyl acrylate, 450 g of 4-hydroxybutyl acrylate and 30 g of acrylic acid was metered into the reactor at a uniform rate over the course of 4 hours, and an initiator solution of 150 g of t-butyl perethylhexanoate in 90 g of the above-described aromatic solvent was metered into the reactor at a uniform rate over the course of 4.5 hours. The additions of the monomer mixture and of the initiator solution were commenced simultaneously. After the end of the initiator feed, the reaction mixture was held at 140° C. for two hours more and then cooled. The resulting polymer solution had a solids content of 65%, determined in a forced air oven at 130° C. for 1 h, an acid number of 15, and a viscosity of 3 dPas (measured on a 60% dilution of the polymer solution in the above-described aromatic solvent, using an ICI cone-and-plate viscometer at 23° C.).

Preparation Example 4

The Preparation of a Thixotroping Paste

A stirred laboratory mill from Vollrath was charged with 800 g of millbase consisting of 323.2 g of the methacrylate copolymer from preparation example 3, 187.2 g of butanol, 200.8 g of xylene and 88.8 g of Aerosil® 812 (Degussa AG, Hanau), together with 1 100 g of quartz sand (particle size 0.7–1 mm) and this millbase was dispersed for 30 minutes with water cooling. Subsequently, the quartz sand was separated off.

Examples 3 to 8

The Preparation of Inventive Two-component Dual-cure Clearcoat Materials

Example 3

The clearcoat material from example 3 was prepared by mixing and homogenizing the following constituents:

Stock Coating:
- 28.04 parts by weight of the methacrylate copolymer (A1) from preparation example 1,
- 16.87 parts by weight of the methacrylate copolymer (A2) from preparation example 2,
- 20 parts by weight of an aliphatic urethane acrylate based on an isophorone diisocyanate containing 6 acrylate groups in the molecule (Ebecryl® 1290 from UCB, Belgium),
- 2.13 parts by weight a tris(alkoxy-carbonylamino)triazine (TACT® from CYTEC; 50% strength solution in butanol),
- 2.13 parts by weight of the thixotroping paste from preparation example 4,
- 14.44 parts by weight of sag control agent (Setalux® 81753 from Akzo; urea content 1.3% by weight),
- 1.14 parts by weight of a UV absorber (Cyagard® 1164L; substituted hydroxyphenyltriazine, 65% strength in xylene),
- 0.76 part by weight of a reversible free-radical scavenger (Tinuvin® 292; sterically hindered amine (HALS)),
- 2.13 parts by weight of Dibasic Ester® from Du Pont (mixture of dialkyl esters of succinic acid, glutaric acid and adipic acid),
- 0.1 part by weight of a conductivity additive (Byk® ES 80),
- 0.8 part by weight of a dispersant (Disperbyk® 161),
- 0.16 part by weight of a leveling agent (Byk®310),
- 5.2 parts by weight of butyldiglycol acetate,
- 4.8 parts by weight of methoxypropyl acetate (technical-grade mixture), and
- 1.3 parts by weight of butyl acetate Crosslinking Agent:
90% dilution of the trimer of the isocyanurate type of hexamethylene diisocyanate in solvent naphtha/butyl acetate 1:1 (Desmodur® N 3390 from Bayer AG).

The ratio of stock coating to crosslinking agent was 100:33.

Example 4

Example 3 was repeated but using
- 44.91 parts by weight of the methacrylate copolymer (A1) from preparation example 1 instead of 28.04 parts by weight of the methacrylate copolymer (A1) from preparation example 1 and 16.87 parts by weight of the methacrylate copolymer (A2) from preparation example 2.

Example 5

Example 3 was repeated but using
- 54.8 parts by weight of Desmodur® N 3390,
- 35.2 parts by weight of the trimer of the isocyanate type of isophorone diisocyanate (Desmodur® Z4470, 70% strength, from Bayer AG) and
- 10 parts by weight of butyl acetate as crosslinking agent instead of Desmodur® N 3390. The ratio of stock coating to crosslinking agent was 100:39.5.

Example 6

Example 5 was repeated but using
- 44.91 parts by weight of the methacrylate copolymer (A1) from preparation example 1 instead of 28.04 parts by weight of the methacrylate copolymer (A1) from preparation example 1 and 16.87 parts by weight of the methacrylate copolymer (A2) from preparation example 2.

Example 7

Example 3 was repeated but using
- 23 parts by weight of Desmodur® N 3390
- 64 parts by weight of Desmodur® Z4470,
- 6.5 parts of by weight of butyl acetate and
- 6.5 parts by weight of Solventnaphtha® instead of Desmodur® N3390 alone. The ratio of stock coating to crosslinking agent was 100:50.

Example 8

Example 7 was repeated but using
- 44.91 parts by weight of the methacrylate copolymer (A1) from preparation example 1 instead of 28.04 parts by weight of the methacrylate copolymer (A1) from preparation example 1 and 16.87 parts by weight of the methacrylate copolymer (A2) from preparation example 2.

The clearcoat materials of examples 3 to 8 had a long processing time and could be applied without problems.

Examples 9 to 14

The Production of Multicoat Color and/or Effect Coating Systems with Inventive Clearcoats of the Invention For example 9, the clearcoat material from example 3 was used.

For example 10, the clearcoat material from example 4 was used.

For example 11, the clearcoat material from example 5 was used.

For example 12, the clearcoat material from example 6 was used.

For example 13, the clearcoat material from example 7 was used.

For example 14, the clearcoat material from example 8 was used.

For the coatings tests, multicoat systems were produced on steel test panels. These panels had been coated with an electrocoat in a dry film thickness of from 18 to 22 μm. The test panels were first of all coated with a water-based primer-surfacer. The resulting primer-surfacer film was baked at 160° C. for 20 minutes to give a primer-surfacer coat having a dry film thickness of from 35 to 40 μm. The primer-surfacer coat was subsequently coated with an aqueous basecoat material from BASF Coatings AG (MB 9040) in a film thickness of from 12 to 15 μm. The resulting aqueous basecoat films were flashed off at 80° C. for 10 minutes. Thereafter the clearcoat materials of examples 3 to 8 were applied vertically by an electrostatic method (bell type: Eccobell) in a single application, each in a film thickness of from 40 to 45 μm. The clearcoat films were subsequently flashed off at room temperature for 10 minutes and at 80° C. for 10 minutes. The flashed-off clearcoat films were cured first with UV radiation (dose: 1 500 mJ/cm$^2$; belt speed 4 m/min). Thereafter, the aqueous basecoat films and the clearcoat films were thermally cured in a forced air oven at 130° C. for 22 minutes.

To measure the micropenetration hardness, clearcoats were produced separately on steel panels (cf. example 2). In order to simulate their curing behavior in shadow zones of substrates, one series of test panels was cured only thermally.

The scratch resistance was determined using the Amtec test, brush test and sand test, these tests being known in the art. The gloss was determined in accordance with DIN 67530 before and after exposure.

The chemical resistance was determined with the aid of the MB gradient oven test, which is known in the art, after aging of the multicoat systems at room temperature for 72 hours. The temperatures reported are those at which damage to the clearcoats first became evident.

The intercoat adhesion (basecoat/clearcoat) was determined using the cross-cut test.

In addition, one series of test panels was sanded and overcoated with a customary and known multicoat automotive refinish. The adhesion between original finish and refinish was again determined using the cross-cut test.

Additionally, one series of test panels was recoated with the aqueous basecoat material and overcoated with the respective clearcoat material of examples 3 to 8, in order to simulate the production-line repair coating of a motor vehicle in the unsanded state. Subsequently, the production-line repair coating films were cured under the same conditions as for the original finishes (multicoat systems of examples 9 to 14). The adhesion was again determined using the cross-cut test.

The cross-cut test was conducted as described in Römpp Lexikon Lacke und Druckfarben, Georg Thieme Verlag, Stuttgart, N.Y., 1998, page 263, "Cross-cut test".

The results of the investigations can be found in table 1.

TABLE 1

Results of the coatings tests on the multicoat systems and clearcoats of examples 9 to 14

| Test | Remark | 9 | 10 | 11 | 12 | 13 | 14 |
|---|---|---|---|---|---|---|---|
| Amtec | Initial gloss | 89 | 89 | 88 | 86 | 85 | 88 |
|  | Gloss without wiping | 36 | 47 | 36 | 35 | 26 | 36 |
|  | Gloss with wiping | 71 | 60 | 68 | 59 | 51 | 54 |
|  | delta gloss with wiping | 18 | 29 | 20 | 27 | 34 | 34 |

TABLE 1-continued

Results of the coatings tests on the multicoat systems and clearcoats of examples 9 to 14

| Test | Remark | 9 | 10 | 11 | 12 | 13 | 14 |
|---|---|---|---|---|---|---|---|
| Brush test | Initial gloss | 89 | 89 | 88 | 86 | 85 | 88 |
|  | Gloss after exposure | 67 | 68 | 60 | 57 | 52 | 62 |
|  | Gloss after 2 h/40° C. | 70 | 73 | 63 | 59 | 56 | 64 |
|  | Gloss after 2 h/60° C. delta gloss: | 79 | 73 | 63 | 61 | 58 | 69 |
|  | Brush test | 22 | 21 | 28 | 29 | 33 | 26 |
|  | 2 h/40° C. | 19 | 16 | 25 | 27 | 29 | 24 |
|  | 2 h/60° C. | 10 | 8 | 23 | 25 | 27 | 19 |
| Sand test | Initial gloss | 89 | 89 | 88 | 86 | 85 | 88 |
|  | Gloss after exposure | 67 | 68 | 65 | 63 | 59 | 65 |
|  | Gloss after 2 h/40° C. | 68 | 69 | 66 | 63 | 60 | 65 |
|  | Gloss after 2 h/60° C. delta gloss: | 72 | 74 | 69 | 64 | 60 | 67 |
|  | Sand test | 22 | 21 | 22 | 22 | 26 | 23 |
|  | 2 h/40° C. | 21 | 20 | 22 | 22 | 26 | 23 |
|  | 2 h/60° C. | 17 | 15 | 18 | 21 | 25 | 21 |
| Chemical resistance (° C.) | Sulfuric acid | 47 | 51 | 57 | 54 | 57 | 53 |
|  | Pancreatin | <36 | <36 | <37 | <36 | 42 | <36 |
|  | Tree resin | >62 | 59 | >62 | 60 | >62 | 50 |
|  | Distilled water | >62 | >62 | >62 | >62 | >62 | >62 |
| Micropenetration hardness (N/mm2) | Curing: |  |  |  |  |  |  |
|  | Without UV | 109.2 | 83.9 | 109.2 | 83.9 | 145.9 | 112.3 |
|  | UV and thermally | 153.7 | 143.1 | 172.1 | 175.1 | 181.7 | 168.5 |
| Adhesion (GT) | Intercoat | 0.5 | 0.5 | 0.5 | 1.5 | 1 | 0.5 |
|  | Production-line repair coating | 0.5 | 0.5 | 0.5 | 2.5 | 5 | 0.5 |
|  | Automotive refinish | 0.5 | 0.5 | 0.5 | 0.5 | 0.5 | 0.5 |

The results show the high level of hardness of the clearcoat of the invention, even in the shadow zones, the high chemical resistance and water resistance, the high scratch resistance and the very good adhesion of the clearcoats of the invention. Furthermore, the results show that the profile of properties of the clearcoat materials of the invention may be varied widely by way of their material composition and adapted outstandingly to the respective end use.

What is claimed is:

1. A mixture curable thermally and with actinic radiation comprising
    (A) a binder free from carbon-carbon double bonds activatable with actinic radiation comprising at least one (meth)acrylate copolymer containing on average per molecule at least one isocyanate-reactive functional group and having a glass transition temperature Tg of from −40 to +80° C.,
    (B) at least one polyisocyanate that is at least one of blocked and unblocked having at least one soft, flexibilizing segment, which as a constituent of three-dimensional polymeric networks lowers their glass transition temperature Tg, and (C) at least one unsaturated polyfunctional urethane that is free from isocyanate-reactive functional groups and contains on average per molecule more than four carbon-carbon double bonds activatable with actinic radiation and at least one hardening segment, the hardening segment as a constituent of three-dimensional polymer networks increasing their glass transition temperature Tg.

2. The mixture of claim 1, wherein the binder comprises (A1) at least one (meth)acrylate copolymer containing on average per molecule at least one isocyanate-reactive functional group and having a glass transition temperature Tg below room temperature, and (A2) at least one (meth)acrylate copolymer containing on average per molecule at least one isocyanate-reactive functional group and having a glass transition temperature Tg above room temperature.

3. The mixture of claim 2, wherein the glass transition temperature Tg of the (meth)acrylate copolymer (A1) is below 0° C. and the glass transition temperature Tg of the (meth)acrylate copolymer (A2) is above 30° C.

4. The mixture of claim 1, wherein the isocyanate-reactive groups are selected from the group consisting of hydroxyl groups, thiol groups, primary amino groups, secondary amino groups, and combinations thereof.

5. The mixture of claim 4, wherein the isocyanate-reactive groups are hydroxyl groups.

6. The mixture of claim 1, wherein the at least one (meth)acrylate copolymer has a hydroxyl number of from 50 to 300 mg KOH/g.

7. The mixture of claim 1, wherein the at least one (meth)acrylate copolymer has an acid number of up to 70 nag KOH/g.

8. The mixture of claim 1, wherein the carbon-carbon double bond is present in at least one of a (meth)acryloyl group, an ethacryloyl group, a crotonate group, a cinnamate group, a vinyl ether group, a vinyl ester group, an ethenylarylene group, a dicyclopentadienyl group, a norbornenyl group, an isoprenyl group, an isopropenyl group, an allyl group, a butenyl group, an ethenylarylene ether group, a dicyclopentadienyl ether group, a norbornenyl ether group, an isoprenyl ether group, an isopropenyl ether group, an allyl ether group, a butenyl ether group, an ethenylarylene ester group, a dicyclopentadienyl ester group, a norbornenyl ester group, an isoprenyl ester group, an isopropenyl ester group, an allyl ester group, an a butenyl ester group.

9. The mixture of claim 8, wherein the carbon-carbon double bonds are present in a (meth)acryloyl group.

10. The mixture of claim 1, wherein the soft, flexibilizing segment is selected from the group consisting of (i) alkanediyl radicals having from 4 to 20 carbon atoms that are unsubstituted or substituted and are linear or branched;

(ii) divalent polyester radicals comprising repeating polyester units of the formula $-(-CO-(CHR^1)_m-CH_2-O-)-$, in which the index m is from 4 to 6 and the substituent $R^1$ is hydrogen or an alkyl, cycloalkyl or alkoxy radical, no one substituent containing more than 12 carbon atoms;

(iii) divalent linear polyether radicals of the general formula $-(-O-(CHR^2)_o-)_pO-$, where the substituent $R^2$ is hydrogen or a lower, unsubstituted or substituted alkyl radical and the index o is from 2 to 6, and the index p is from 2 to 100;

(iv) linear divalent siloxane radicals, (v) divalent hydrogenated polybutadiene radicals;

(vi) divalent hydrogenated polyisoprene radicals;

(vii) divalent radicals of random or alternating butadiene-isoprene copolymers;

(viii) divalent radicals of butadiene-isoprene graft copolymers; and (ix) divalent radicals of ethylene-propylene-diane copolymers.

11. The mixture of claim 1, wherein the hardening segments are selected from the group consisting of aromatic radicals and cycloaliphatic radicals that are at least divalent.

12. The mixture of claim 11, wherein the hardening segments are selected from the group of the cycloaliphatic radicals.

13. The mixture of claim 1, wherein the at least one polyisocyanate comprises linear aliphatic segments.

14. The mixture of claim 13, wherein the at least one polyisocyanate comprising linear aliphatic segments are selected from the group consisting of hexamethylene diisocyanate and its oligomers.

15. The mixture of claim 1, wherein the at least one unsaturated polyfunctional urethane comprises a product of polyisocyanates comprising methyl-substituted cycloaliphatic segments.

16. The mixture of claim 15, wherein the polyisocyanates comprising methyl-substituted cycloaliphatic segments are selected from the group consisting of isophorone diisocyanate and its oligomers.

17. The mixture of claim 1, wherein the mixture is present in one of a dispersion in an organic solvent, a solution in an organic solvent or as a solvent-free mixture.

18. The mixture of claim 17, wherein the solvent-free mixture is present in liquid form or powder form.

19. The mixture of claim 1, wherein the mixture is one of a coating material, an adhesive, or a sealing compound.

20. The mixture of claim 19, wherein the coating material is a clearcoat material.

21. A method comprising applying the mixture of claim 1 to a substrate as one of an automotive OEM finish, an automotive refinish, a building coating, a furniture coating, a window coating, a door coating, an industrial coating, a coil coating, a container coating, an impregnation of electrical components, an electrical component coating, a white goods coating, an appliance coating, a boiler coating, and a radiator coating.

* * * * *